United States Patent [19]
Yamanaka et al.

[11] Patent Number: 5,210,744
[45] Date of Patent: May 11, 1993

[54] CELL EXCHANGE APPARATUS

[75] Inventors: Hideaki Yamanaka; Kazuyoshi Oshima; Toshihiro Shikama; Shigeru Aoyama, all of Kanagawa, Japan

[73] Assignee: Mitsubishi Denki Kabushiki Kaisha, Japan

[21] Appl. No.: 542,244

[22] Filed: Jun. 22, 1990

[30] Foreign Application Priority Data

Jun. 28, 1989 [JP] Japan .................................. 1-165645
Jul. 14, 1989 [JP] Japan .................................. 1-182215

[51] Int. Cl.⁵ ........................ H04Q 11/04; H04J 3/24
[52] U.S. Cl. ...................................... 370/60; 370/94.1
[58] Field of Search ................. 370/58.1, 58.2, 58.3, 370/60, 60.1, 94.1; 340/825.52

[56] References Cited

U.S. PATENT DOCUMENTS

| | | | |
|---|---|---|---|
| 4,603,416 | 7/1986 | Servel et al. | 370/60 |
| 4,821,259 | 4/1989 | DeBruler et al. | 370/60 |
| 4,837,761 | 6/1989 | Isono et al. | 370/60 |
| 4,910,731 | 3/1990 | Sakurai et al. | 370/60 |
| 4,920,531 | 4/1990 | Isono et al. | 370/60 |
| 4,935,922 | 6/1990 | Wicklund et al. | 370/60 |
| 4,947,388 | 8/1990 | Kuwahara et al. | 370/60 |
| 4,956,839 | 9/1990 | Torii et al. | 370/60 |
| 4,993,018 | 2/1991 | Hajikano et al. | 370/60 |
| 5,046,064 | 9/1991 | Suzuki et al. | 370/60 |

FOREIGN PATENT DOCUMENTS 0292962 11/1988 European Pat. Off. .
0299473 1/1989 European Pat. Off. .
8602510 4/1986 PCT Int'l Appl. .

OTHER PUBLICATIONS

H. Kuwahara, et al., "A Shared Buffer Memory Switch for an ATM Exchange", ICC 89 4.4, pp. 118–122, 1989.
J. Y. Hui, et al. "A Broadband Packet Switch for Integrated Transport", IEEE J. Selected Areas Comm. SAC-5, 8, pp. 1264–1273 (Oct. 1987).
J. Coudreuce, et al. "Prelude: An Asynchronous Time-Division Switched Network", ICC, 87 2.2, pp. 769–773 (Jun. 1987).
Y. S. Yeh, et al., "The Knockout Switch: A Simple Modular Architecture for High Performance Packet Switching", in Proc. ISS '87, pp. 801–808 (Mar. 1987).

Primary Examiner—Douglas W. Olms
Assistant Examiner—Alpus H. Hsu
Attorney, Agent, or Firm—Wolf, Greenfield & Sacks

[57] ABSTRACT

A cell exchange apparatus wherein cell input ports and cell output ports are divided into a plurality of groups and input cells are multiplexed for each group. Multiplexed cells are selected in accordance with their addresses with respect to output port groups and buffered by use of a plurality of buffers. Writing and reading of cells with respect to the buffers are controlled by a memory controller in accordance with the load on each buffer.

7 Claims, 17 Drawing Sheets

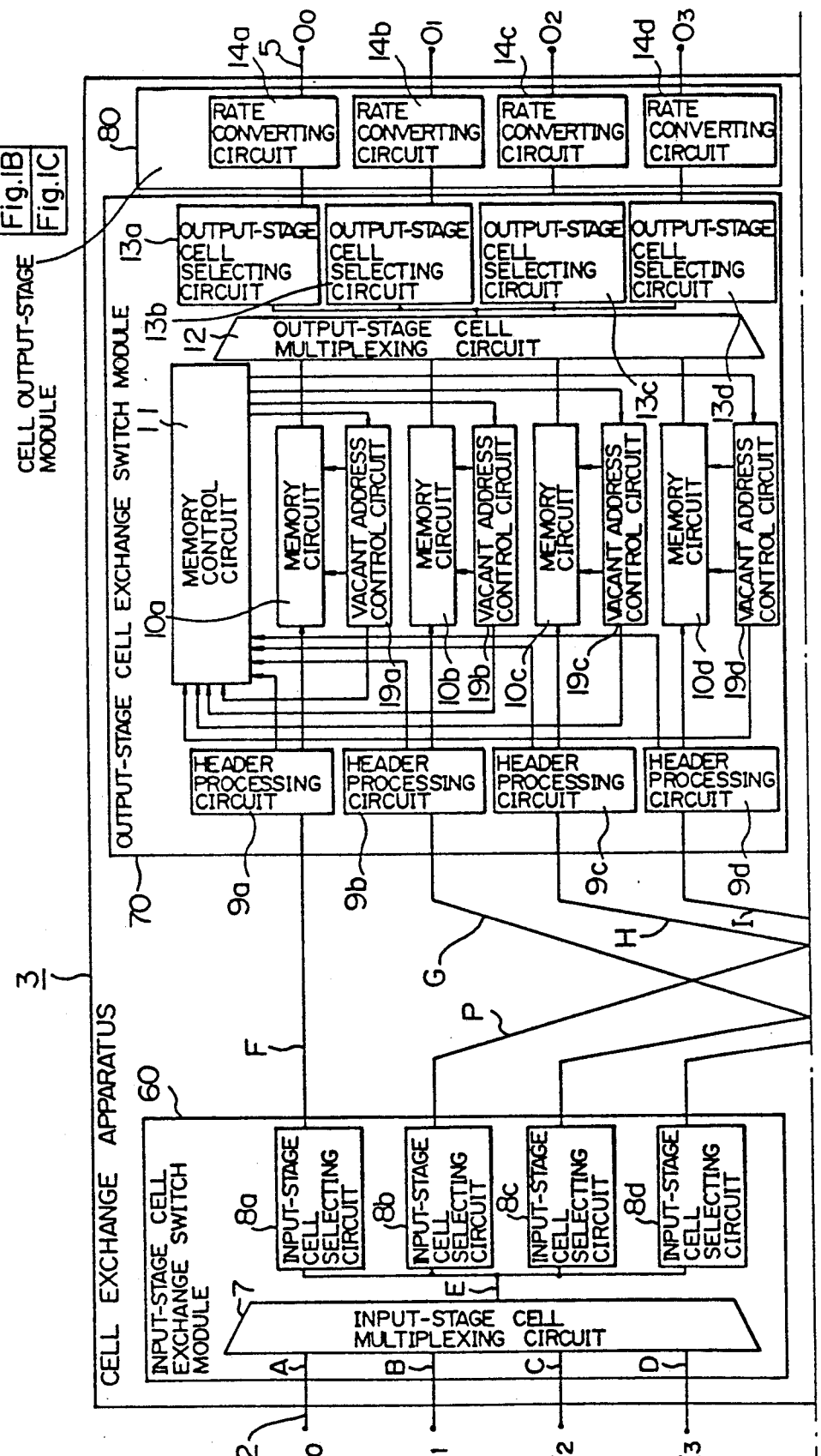

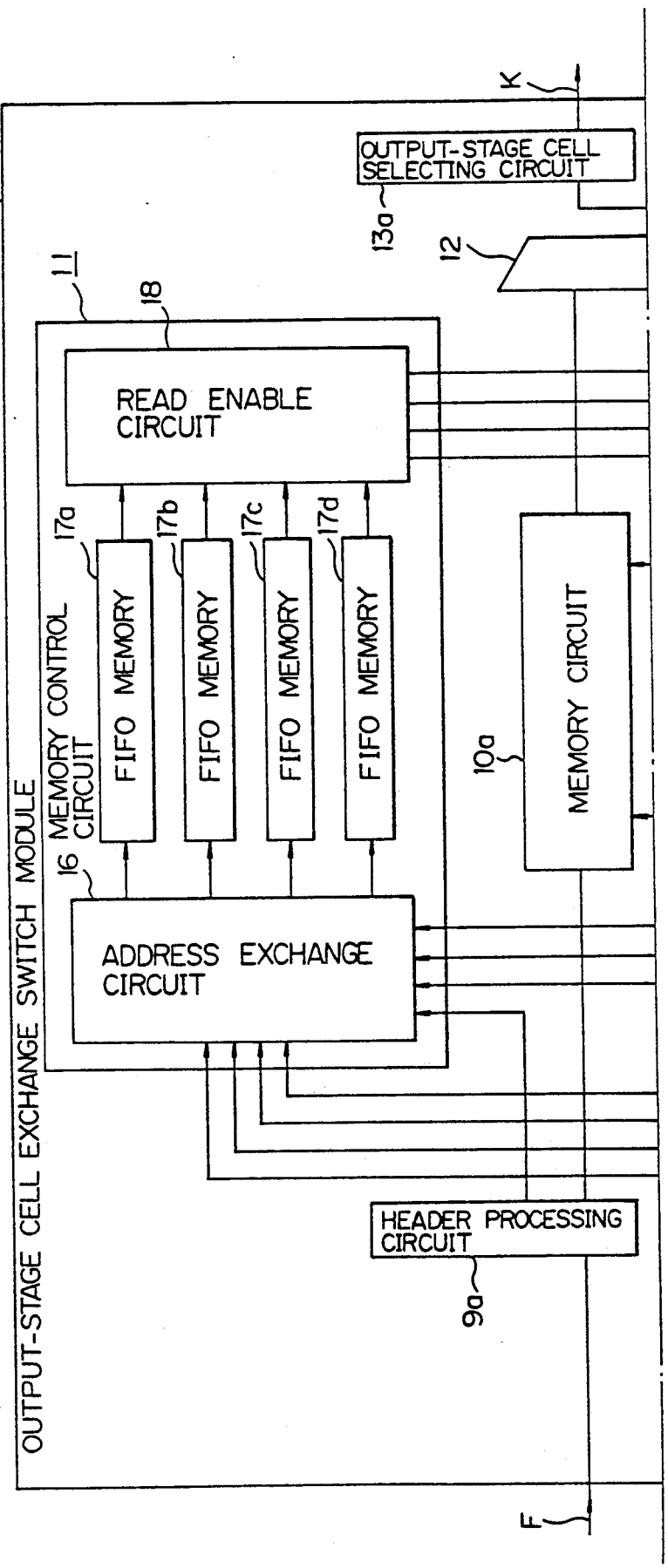

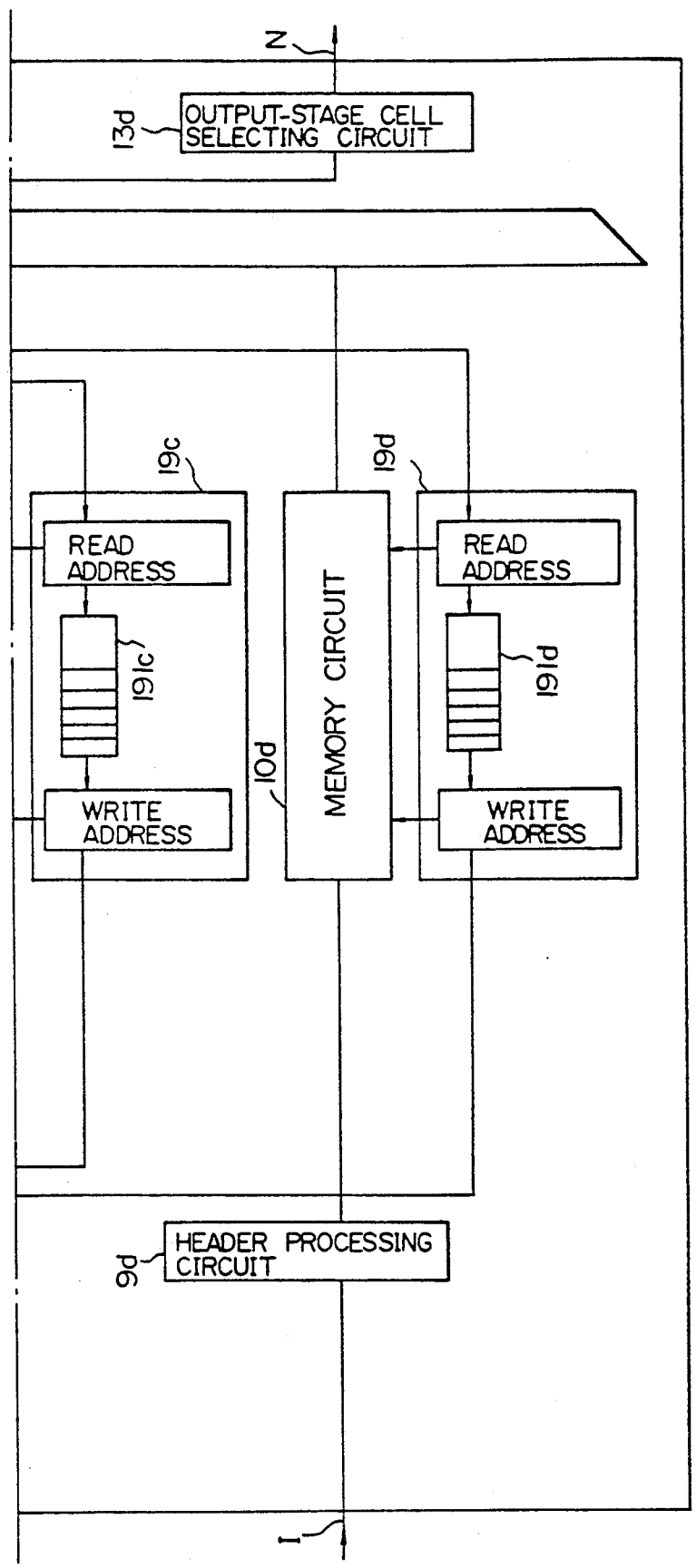

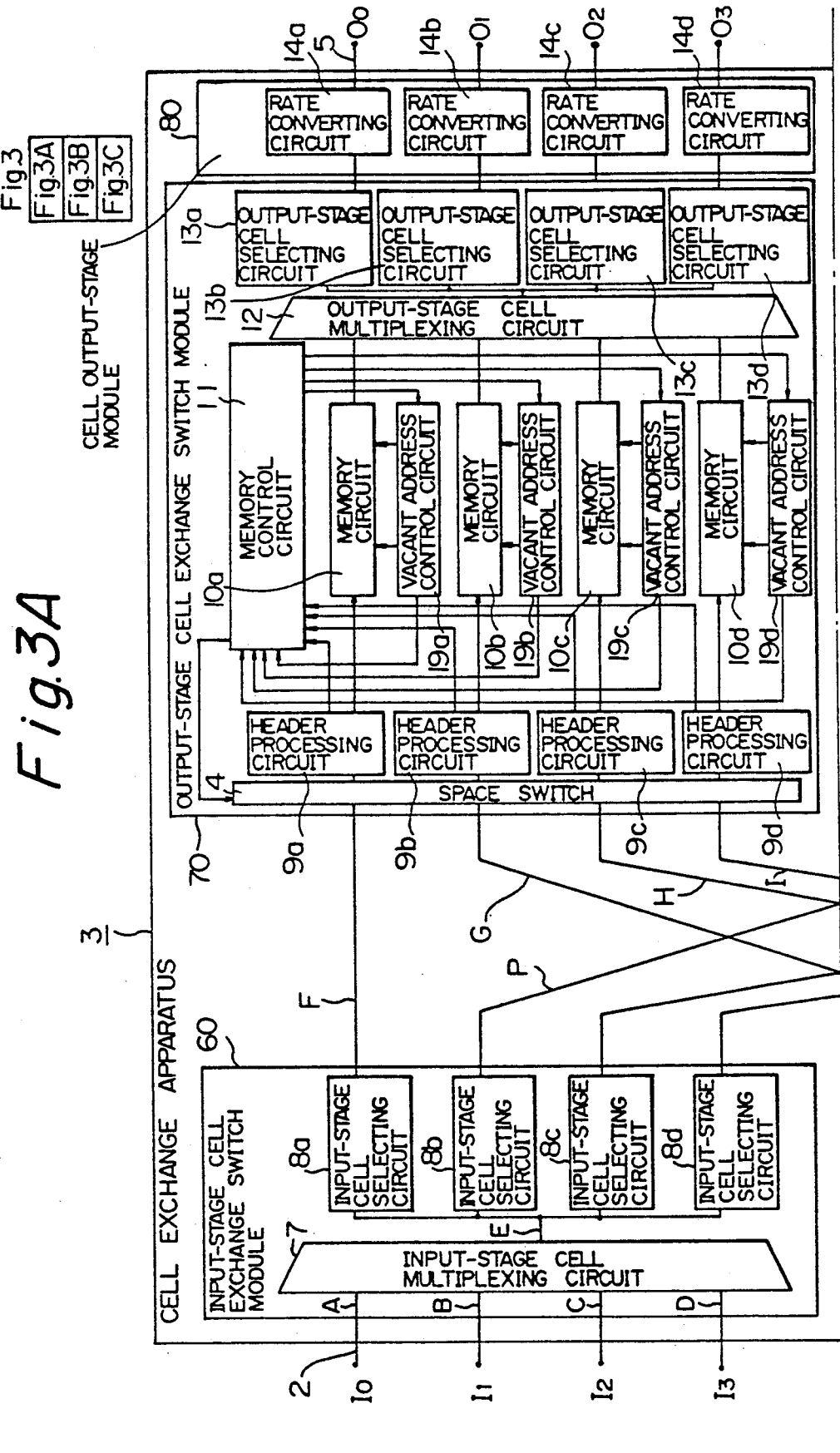

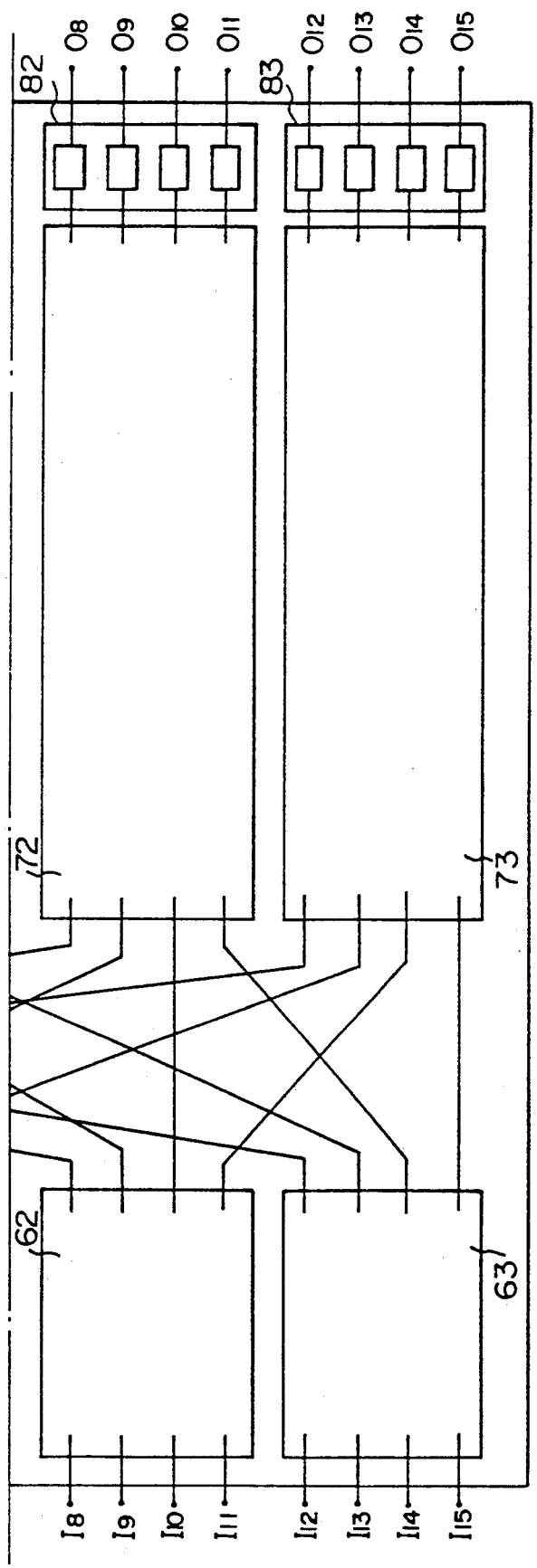

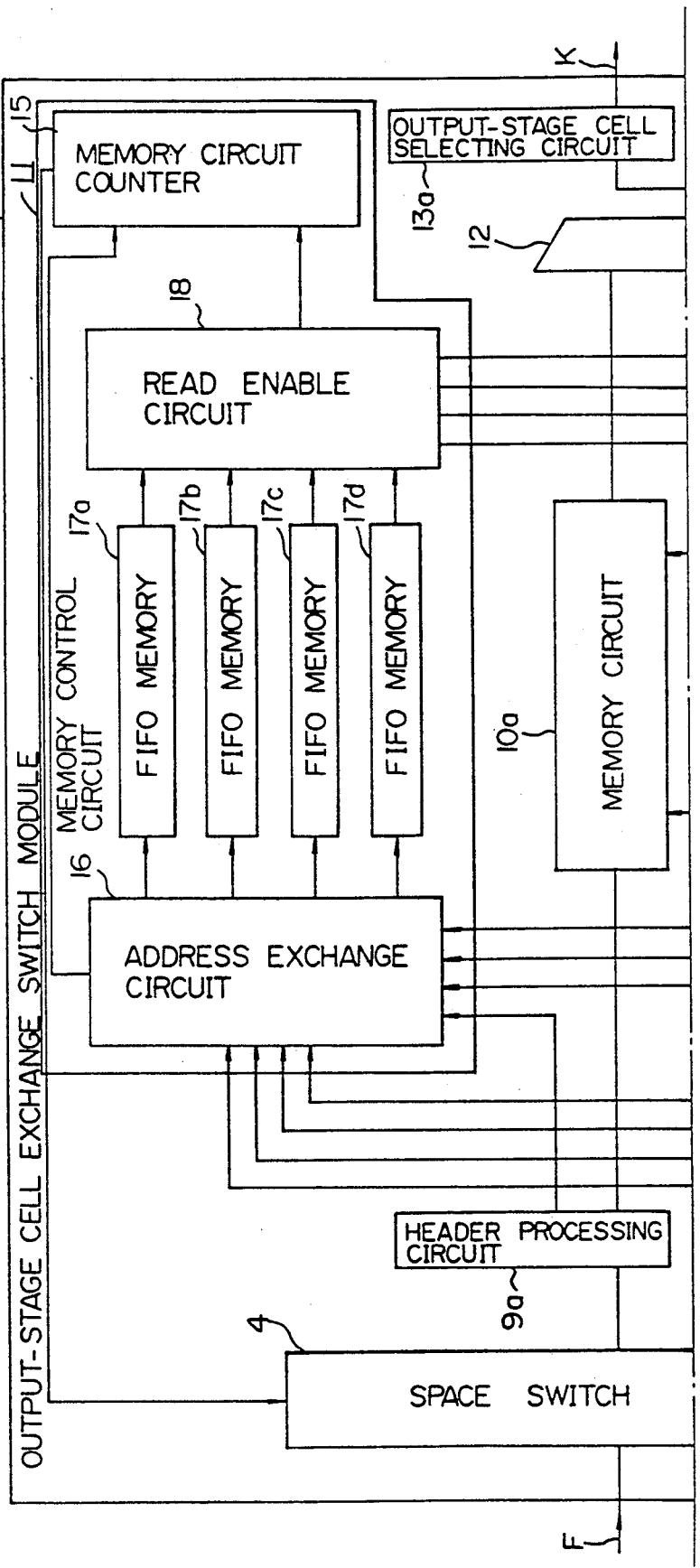

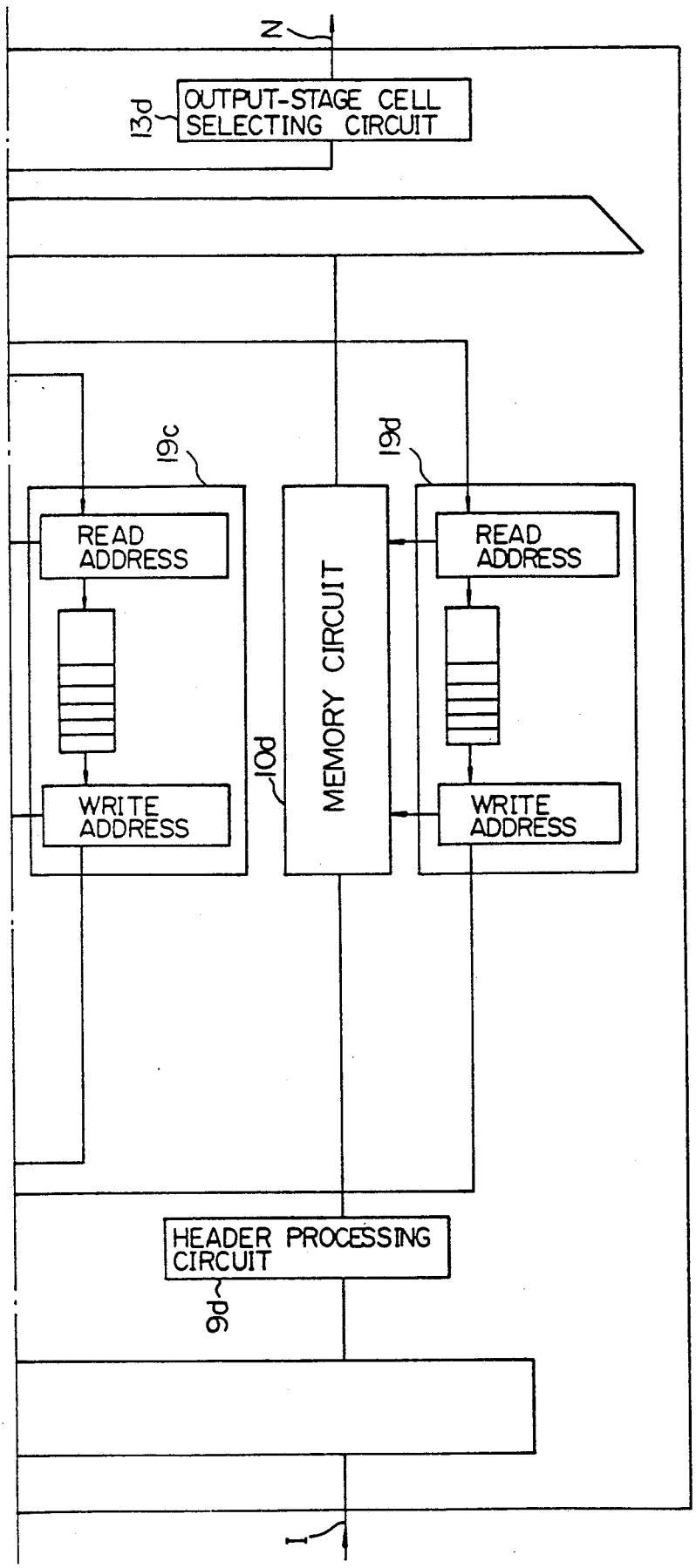

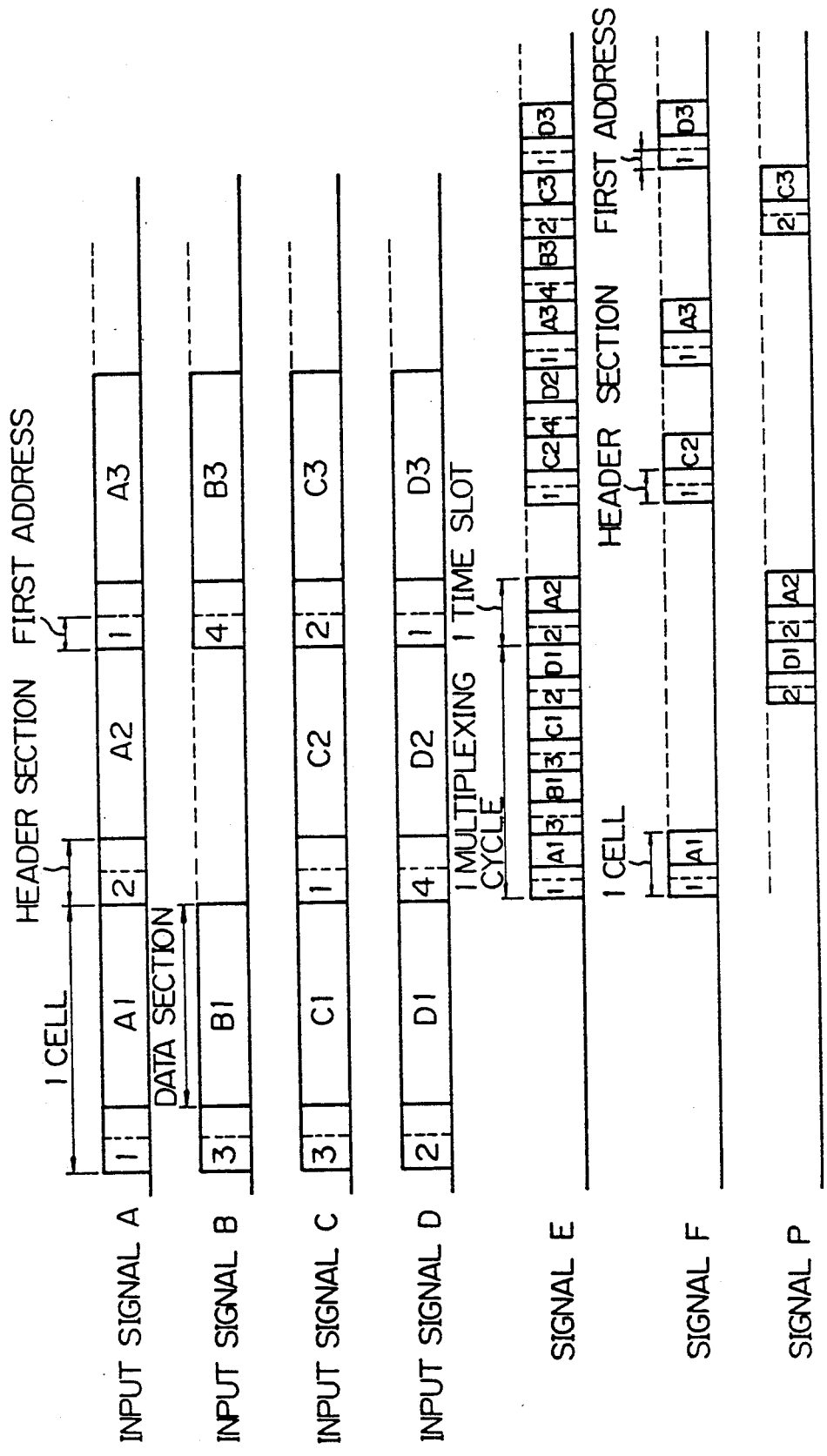

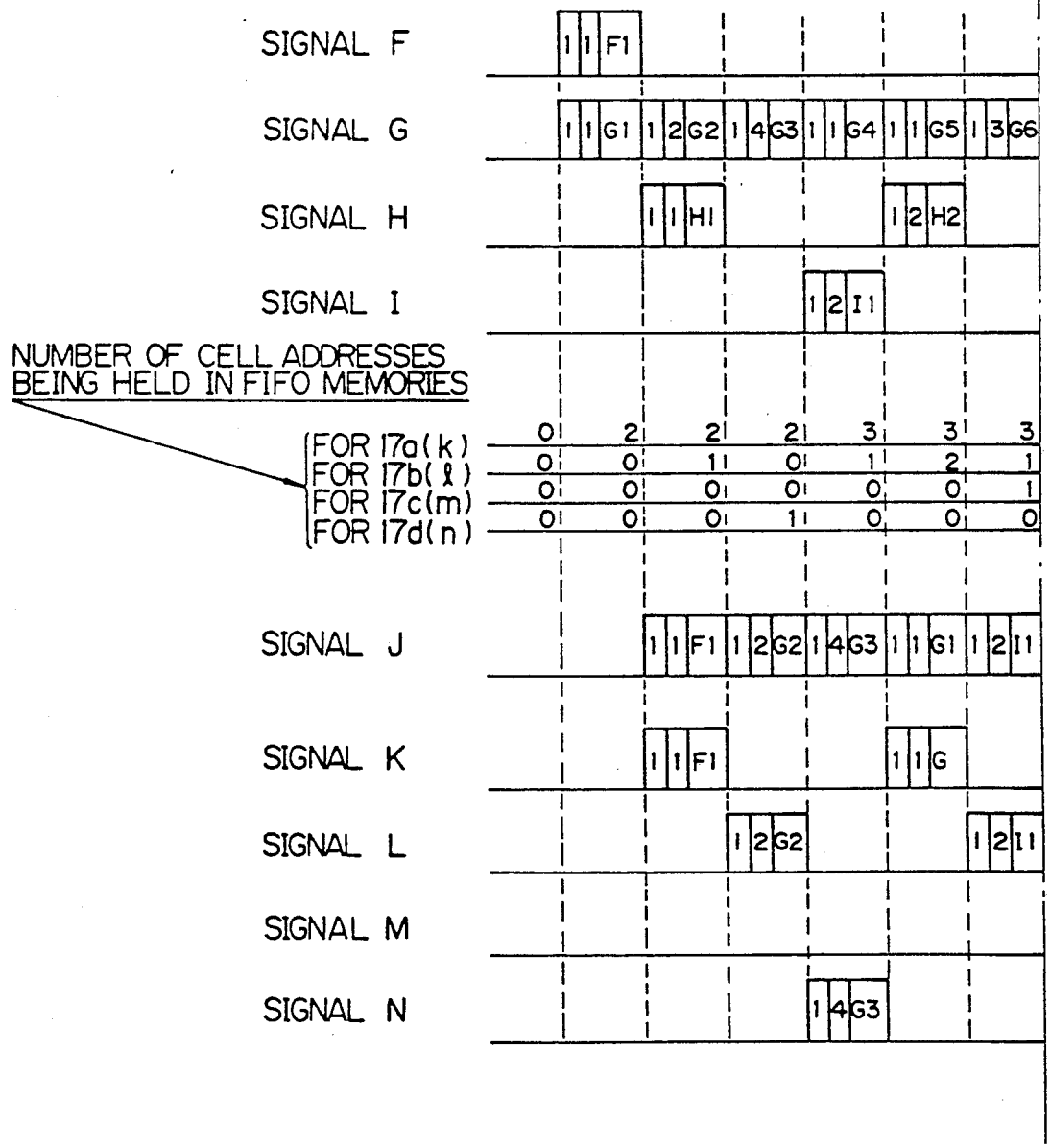

Fig.6C

THIRD ADDRESS AND THOSE
THEREAFTER OMITTED

| | | | | | |
|---|---|---|---|---|---|
| 1 | 1 | 0 | 0 | 0 | 0 |
| 1 | 1 | 1 | 0 | 0 | 0 |
| 2 | 1 | 1 | 1 | 0 | 0 |
| 0 | 0 | 0 | 0 | 0 | 0 |

| 2 H4 | 1 3 I2 | 1 1 G8 | 1 2 F4 | 1 3 G10 |

| | | 1 1 G8 | | |

| 2 H4 | | | 1 2 F4 | |

| | 1 3 I2 | | | 1 3 G10 |

CELL EXCHANGE APPARATUS

CROSS REFERENCES TO RELATED APPLICATIONS

The present application is related to copending application Ser. No. 07/513,562, filed on Apr. 24, 1990.

BACKGROUND OF THE INVENTION

1. Field of the Invention

The present invention relates to a cell exchange apparatus for high-speed exchange of various information such as sound, data and picture information in the form of blocks which are called cells.

2. Description of the Prior Art

A switching network, which is called Banyan-network, has heretofore been known as one example of the system in which data is divided into cells and the header information of each cell is directly referred to by hardware means to thereby perform high-speed switching.

FIG. 7 is a block diagram of a conventional cell exchange apparatus which is disclosed, for example in IEEE Journal on Selected Areas in Communications Vol. SAC-4, No. 8, November 1986, pp. 1373-1380. In the figure, reference numerals 1a and 1b denote cells each comprising a header section and a data section, 2 input ports to which cells 1 (1 denoting generally the cells 1a and 1b) are inputted, 3 a cell exchange apparatus that performs switching of cells 1 which are inputted to input ports 2, 4 2×2 unit switches serving as space switches which constitute the cell exchange apparatus 3, and 5 output ports of the cell exchange apparatus 3.

It should be noted that the above-described literature shows a Banyan-network in which the header information of each cell 1 is directly referred to by hardware means to thereby perform high-speed switching, and it uses the term "packet" in place of the term "cell". However, "cell" and "packet" express the same thing in the sense that multimedia information is divided into blocks and a header that includes destination information is given to each block. However, "packet" and "cell" are generally different from each other in that the length of each block of packet is handled as being variable, whereas that of cell is handled as being fixed according to the provisions of international standards. Since the term "cell" is used in asynchronous transmission mode (ATM) communication wherein high-speed transmission and exchange of data are performed, the term "cell" will be employed in place of "packet" in the following description of the prior art.

In operation, each of the 2×2 unit switches 4 that comprise the cell exchange apparatus 3, shown in FIG. 7, selects an output port 5 in accordance with the state of the corresponding bit in a bit string that constitutes the header section of a cell 1. For example, each of the unit switches 4 that are arrayed in the first row from the left as viewed in FIG. 7 performs a switching operation such that, if the top bit in the header section of a cell 1 is "0", the unit switch 4 connects the input port thereof to the upper output port thereof, whereas, if the top bit is "1", it connects the input port to the lower output port. The unit switches 4 that are arrayed in the second row from the left similarly perform a switching operation in accordance with the state of the second bit in the header section of the cell 1. If such unit switches 4 are interconnected as shown in FIG. 7 and the number of a desired output port 5 in the final stage is expressed as a binary number and put to the header section of a cell 1, the cell 1 arrives at the desired output port 5 no matter from which input port 2 it is inputted.

The conventional cell exchange apparatus having the above-described arrangement suffers, however, from the following problems. If cells 1a and 1b which are directed to the same output port 5 are simultaneously inputted to input ports 2, blocking (collision) occurs. In order to solve this problem, a system wherein a buffer memory is provided in the input section or inside of each unit switch 4 has been proposed. With this prior art system, however, the buffer memory is likely to be blocked when cells 1 which are directed to one output port 5 are concentrated therein.

SUMMARY OF THE INVENTION

In view of the above-described problems of the prior art, it is an object of the present invention to provide a cell exchange apparatus which is free from the problem of blocking and capable of performing a switching operation even when cells are concentrated in one output port, with minimized effect on other output ports.

According to a first aspect of the present invention, there is provided a cell exchange apparatus comprising: an input-stage cell exchange switch module having an input-stage cell multiplexing means which subjects input cells to time-division multiplexing for each of a plurality of groups each comprising a plurality of input ports through which cells are inputted, and an input-stage cell selecting means which selects, from an output signal from the input-stage cell multiplexing means, a cell that is directed to a specific one of a plurality of groups each comprising a plurality of output ports and outputs the selected cell; at least one output-stage cell exchange switch module having memory means each of which stores a cell that is outputted from a cell selecting means in the pre-stage to a specific output port group, a memory control means which controls and stores the addresses of cells stored in each memory means according to the destination and reads out cells from the memory means according to a predetermined output rule, an output-stage cell multiplexing means which multiplexes cells that are outputted from the memory means, and an output-stage cell selecting means which selects, from an output signal from the output-stage cell multiplexing means, a cell which is directed to either a specific one of the output port groups or a specific one of the output ports and outputs the selected cell; and a cell output-stage module having a rate converting means that converts the rate of time-division multiplexed cells into a rate of the output ports.

In the cell exchange apparatus according to the present invention, cells which arrive at all input ports are divided into a plurality of groups and once multiplexed by the input-stage cell multiplexing means that is provided in an input-stage cell exchange switch module for each group before being distributed to respective output ports through address filters that comprise the cell selecting means. At least one output-stage cell exchange switch module that receives the output of the input-stage cell exchange switch module writes the cells into the memory means and effects multiplexing of cells again by the cell multiplexing means for each of a plurality of groups of output ports under the control of the memory control means. Thereafter, the multiplexed cells are each distributed to the desired output port through a final address filter that comprises the cell selecting means. Thus, the probability of cells being wasted is lowered.

According to a second aspect of the present invention, each individual buffer memory in the above-described cell exchange apparatus is adapted to be common to all the incoming lines to make uniform the amount of cells being held in each buffer memory, thereby preventing the occurrence of blocking and even more effectively reducing the effect of the concentration of cells in one output port on other output ports.

For this purpose, the cell exchange apparatus stated above is further provided with a space switch that effects spatial switching with respect to each of the cells which are outputted from the cell selecting means in the input-stage cell exchange switch module, and cells which are outputted from the space switch are written into memory means. The memory control means controls and stores the addresses of cells stored in the memory means, according to the destination, and monitors the amount of cells being held in the memory means and reads out cells preferentially from one which is directed to a destination for which a relatively large amount of cells is being held in the memory means.

By virtue of the above-described arrangement, the output-stage cell exchange switch module can preferentially store cells into memory means which have a relatively small amount of cells being held therein and can also read cells preferentially from one which is directed to a destination for which a relatively large amount of cells is being held in the memory means. It is therefore possible to make uniform the amount of cells being held in each memory means (buffer memory). Thus, the probability of cells being wasted is lowered, and even if cells are concentrated in one output port, the cell exchange apparatus is capable of switching without affecting cells which are directed to other output ports.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 1 which includes FIGS. 1A-1C is a block diagram of a first embodiment of the cell exchange apparatus according to the present invention;

FIG. 2 which includes FIGS. 2A-2C is an enlarged block diagram showing the arrangement of one output-stage cell exchange switch module in the embodiment shown in FIG. 1;

FIG. 3 which includes FIGS. 3A-3C is a block diagram of a second embodiment of the cell exchange apparatus according to the present invention;

FIG. 4 which includes FIGS. 4A-4C is an enlarged block diagram showing the arrangement of one output-stage cell exchange switch module in the embodiment shown in FIG. 3;

FIG. 5 is a chart showing the signal format and sequence at various portions of one input-stage cell exchange switch module in the first and second embodiments;

FIG. 6 which includes FIGS. 6A-6C is a chart showing the signal format and sequence at various portions of one output-stage cell exchange switch module in the first and second embodiments.

DETAILED DESCRIPTION OF THE PREFERRED EMBODIMENTS

Figure 1B:
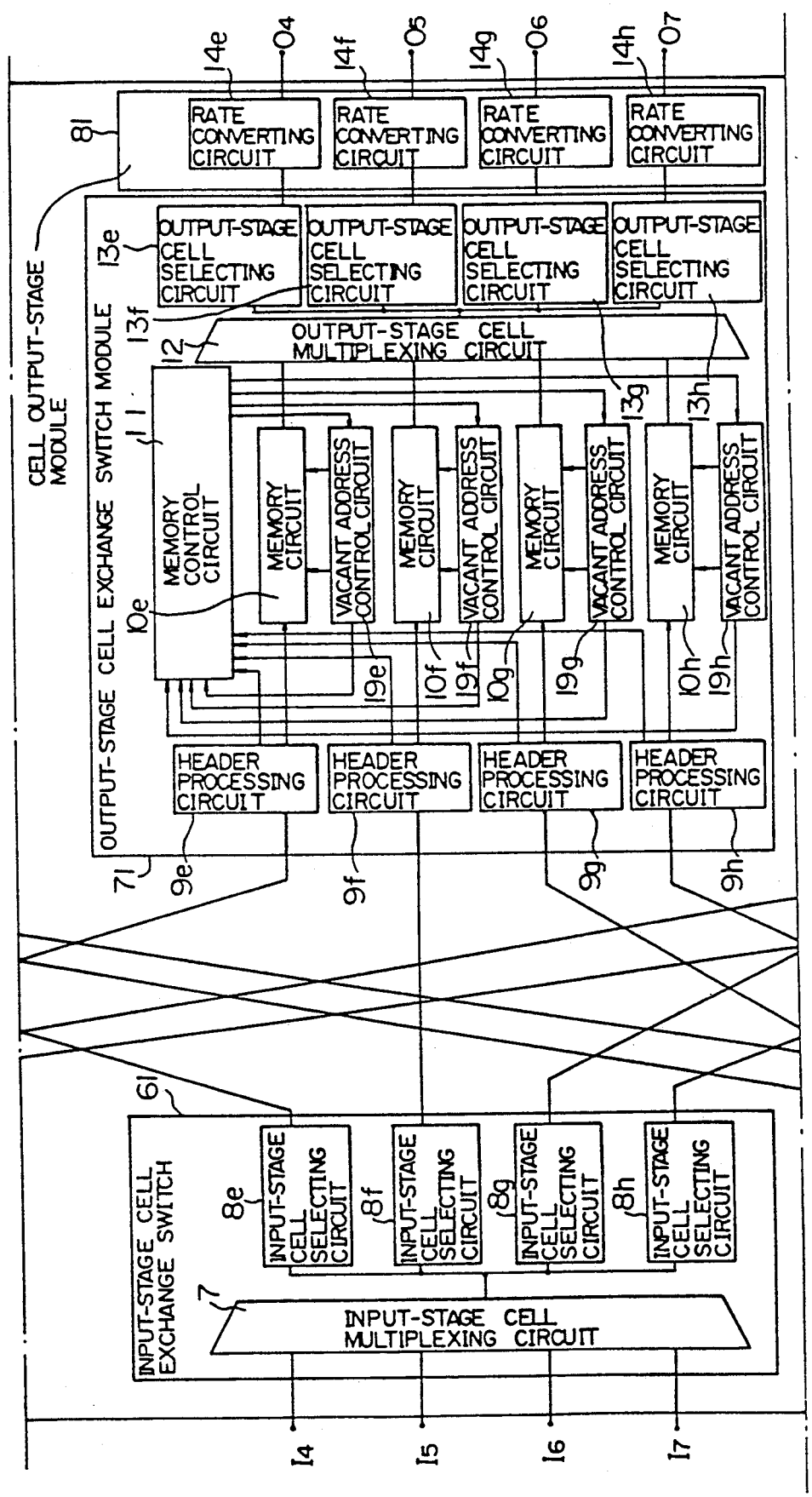
Figure 1C:
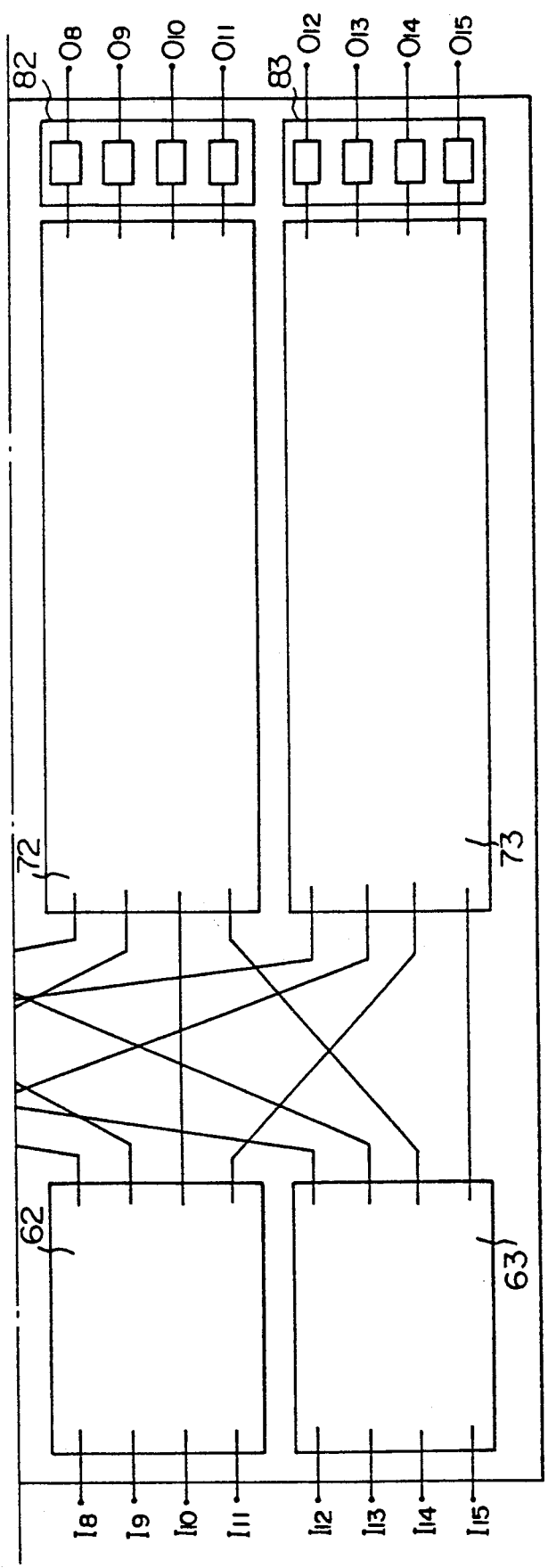

Embodiments of the present invention will be described below with reference to the accompanying drawings. FIG. 1 is a circuit diagram showing the general arrangement of a cell exchange apparatus 3 according to a first embodiment of the present invention. The cell exchange apparatus 3 has input-stage cell exchange switch modules 60 to 63 which are provided to correspond to respective groups of cell input ports 2 to exchange cells which are inputted to the corresponding groups of input ports 2, output-stage cell exchange switch modules 70 to 73 which exchange cells that are delivered from cell exchange switch modules in the pre-stage to specific output port groups, and cell output-stage modules 80 to 83 which constitute final-stage modules.

Figure 2B:
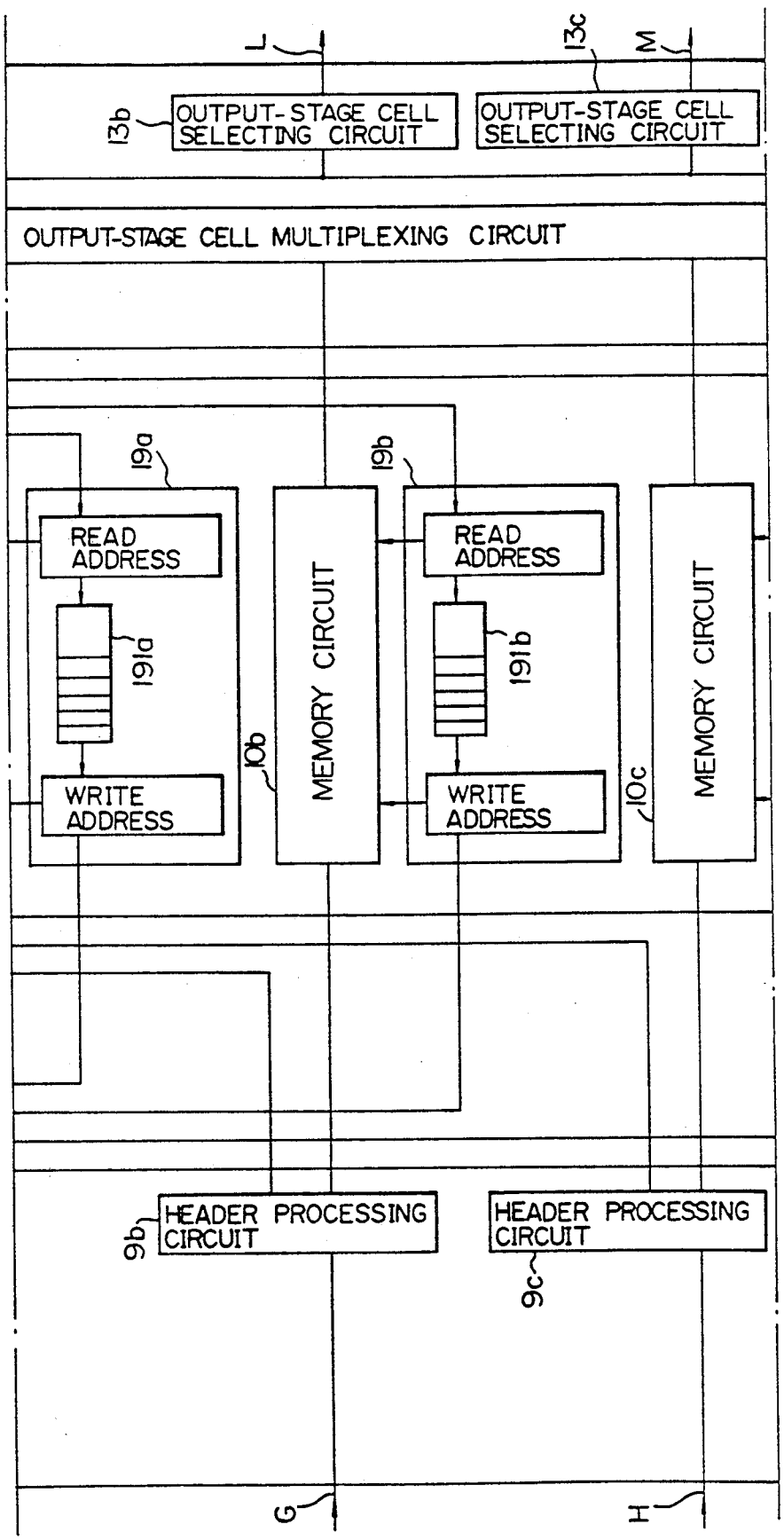

Among the input-stage cell exchange switch modules 60 to 63, the module 60, for example, has an input-stage cell multiplexing circuit 7 which subjects cells to time-division multiplexing, and input-stage cell selecting circuits 8a to 8d each of which selects and outputs through an address filter a cell which is directed to a specific one of the groups of output ports. Among the output-stage cell exchange switch modules 70 to 73, for example, the switch module 70, which is shown in FIG. 2, comprises the following constituent elements: header processing circuits 9a to 9d each of which reads and analyzes the destination information of a cell that is outputted from the corresponding cell selecting circuit in the pre-stage to a specific output port group and then outputs the cell; memory circuits 10a to 10d in which when write addresses are designated, cells that are outputted from the header processing circuits 9a to 9d are stored at the designated addresses, and when read addresses are designated, the stored cells are read out irrespective of the order in which they were written; an address exchange circuit 16 which is provided in a memory control circuit 11 to distribute the addresses of cells that are written in the memory circuits 10a to 10d into output port groups (hereinafter referred to as "outgoing lines") while referring to the header processing circuits 9a to 9d; outgoing line corresponding address FIFO memories 17a to 17d which enables distributed addresses to be written therein in correspondence to outgoing lines and in the order of arrival; a read enable circuit 18 which gives a read address to each of the memory circuits 10a to 10d at a predetermined timing to enable reading of a stored cell; vacant address control circuits 19a to 19d which hold read addresses as vacant addresses when cells are read out from the memory circuits 10a to 10d and provide the addresses, as write addresses, to new cells when arriving at the memory circuits 10a to 10d; an output-stage cell multiplexing circuit 12 which multiplexes cells that are read out from the memory circuits 10a to 10d; and output-stage cell selecting circuits 13a to 13d which select and distribute through address filters cells in the output signal from the circuit 12 which are directed to specific ones of the groups of output ports. Among the cell output-stage modules 80 to 83 shown in FIG. 1, the module 80, for example, has rate converting circuits 14a to 14d which convert the rate of time-division multiplexed cells into a rate of output ports.

The operation will next be explained. It is assumed that in the arrangement shown in FIG. 1 cells have a fixed length, and although input cells arrive at random, the input phase of cells is adjusted before they are inputted to the input ports $I_0$ to $I_{15}$ such that all cells which are inputted from the input ports 2 are supplied in the same cell phase.

The operation of the input-stage (first-stage) cell exchange switch modules 60 to 63 will first be explained with reference to FIG. 5 which shows the operation of the input-stage cell exchange switch module 60. Cells in input signals A to D are subjected to time-division multiplexing in the cell multiplexing circuit 7 to form a signal E that is shown in FIG. 5. The signal E is delivered to the input-stage cell selecting circuits 8a to 8d which respectively correspond to the output ports of the input-stage cell exchange switch module 60, in which the first addresses that are put to the header sections of cells are detected to select and output cells which are to be delivered to given output ports, as shown by signals F and P. FIG. 5 shows the way in which a cell, the first address of which is "1", is outputted as a signal F, while a cell, the first address of which is "2", is outputted as a signal P. In this embodiment, multiplexing is affected at a rate which is determined by multiplying the link rate of input ports by the number of ports, for example, with synchronized time slots each corresponding to one cell, as shown in FIG. 5. A time slot which contains no input cell is defined as a vacant slot, which is assigned a first address that corresponds to none of the output ports.

Thus, in the input-stage cell exchange switch modules 60 to 63, cells which are inputted at the link rate are switched according to the first addresses that are put to the respective header sections, and delivered to the first-stage output ports in a burst manner at the rate of multiplexing.

The operation of the output-stage (second-stage) cell exchange switch modules 70 to 73 will next be explained with reference to FIG. 2 which shows the module 70. Among the output signals from the input-stage cell exchange switch modules 60 to 63, four signals that are inputted to the output-stage cell exchange switch module 70 are assumed to be F, G, H and I, respectively. The signals F to I comprise cells which are delivered to the signals lines in a burst matter at the speed of multiplexing and therefore vary in the number of cells. Accordingly, these signals are supplied to the memory circuits 10a to 10d for buffering, which are provided to correspond to the input ports in the output-stage cell exchange switch module 70. Thereafter, the outputs of the memory circuits 10a to 10d are multiplexed in the output-stage cell multiplexing circuit 12. It is considered that if input cells arrive uniformly both temporally and spatially, all cells which are inputted to the output-stage cell exchange switch module 70 can be multiplexed without being wasted on condition that the rate of the output signal J from the output-stage cell multiplexing circuit 12 is not lower than a rate which is determined by multiplying the input link rate of the output-stage cell exchange switch module 70 by the number of ports. In actual practice, however, the arrival of cells varies both temporally and spatially and it is therefore necessary to buffer cells in the memory circuits 10a to 10d to thereby absorb overflow of cells.

The memory control circuit 11 has a function to prevent successively reading cells which are addressed to the same outgoing line and also prevent inversion of the order in which cells are read out. More specifically, when cells are stored in the memory circuits 10a to 10d, the addresses of the cells in the memory circuits 10a to 10d are distributed into outgoing lines by the address exchange circuit 16 and these addresses are then stored in the outgoing line corresponding address FIFO memories 17a to 17d in order to control and store the addresses of the cells in the memory circuits 10a to 10d in correspondence to the outgoing lines. The read enable circuit 18 refers to the outputs of the FIFO memories 17a to 17d and gives read addresses to all the memory circuits 10a to 10d to send out cells therefrom within the range in which the output-stage (post-stage) cell multiplexing circuit 12 is capable of multiplexing the outputs of all the memory circuits 10a to 10d. A variety of methods may be considered usable to control reading from the memory circuits 10a to 10d, for example, a method wherein N (an integer not less than 2) cells are read out in succession with respect to an outgoing line for which the amount of cells being held in the FIFO memories 17a to 17d is greater than a predetermined value, while n (1 or 0) cell is read out with respect to other outgoing lines, thereby effecting multiplexing; and a method wherein the amounts of cells which are addressed to various outgoing lines are compared with each other, and N cells are read out in succession with respect to an outgoing line for which the amount of cells being held is the largest, while n cell is read out with respect to other outgoing lines, for multiplexing purpose. In either method, a larger number of cells are read out for an outgoing line to which are addressed a relatively large number of cells than for an outgoing line to which are addressed a relatively small number of cells. Under these circumstances, the reading for an outgoing line to which are addressed a relatively small number of cells may be suspended and the delay time may exceed a predetermined value. Any method which may give rise to such a problem must not be used. In the output-stage (final-stage) cell exchange switch module 70, reading from the memory circuits 10a to 10d must be executed uniformly in order to prevent overflow in the post-stage of the outgoing lines where rate conversion is needed. Accordingly, the read enable circuit 18 in the output-stage (final-stage) cell exchange switch module 70 affects control such that cells which are addressed to respective outgoing lines are read out in the numerical order of the outgoing lines.

The following is a description of the operation of an output-stage cell exchange switch module 70, as one example, which is not one in the final stage but in an intermediate stage that is followed by another output-stage cell exchange switch module. The description will be made with reference to the timing charts of FIGS. 5 and 6, in regard to a multiplexing method wherein two cells are read out in succession with respect to an outgoing line for which the number of cells being held exceeds 4 (equivalent to the number of input ports), while 1 or 0 cell is read out with respect to an outgoing line for which said number is not greater than 4.

Figure 6B:
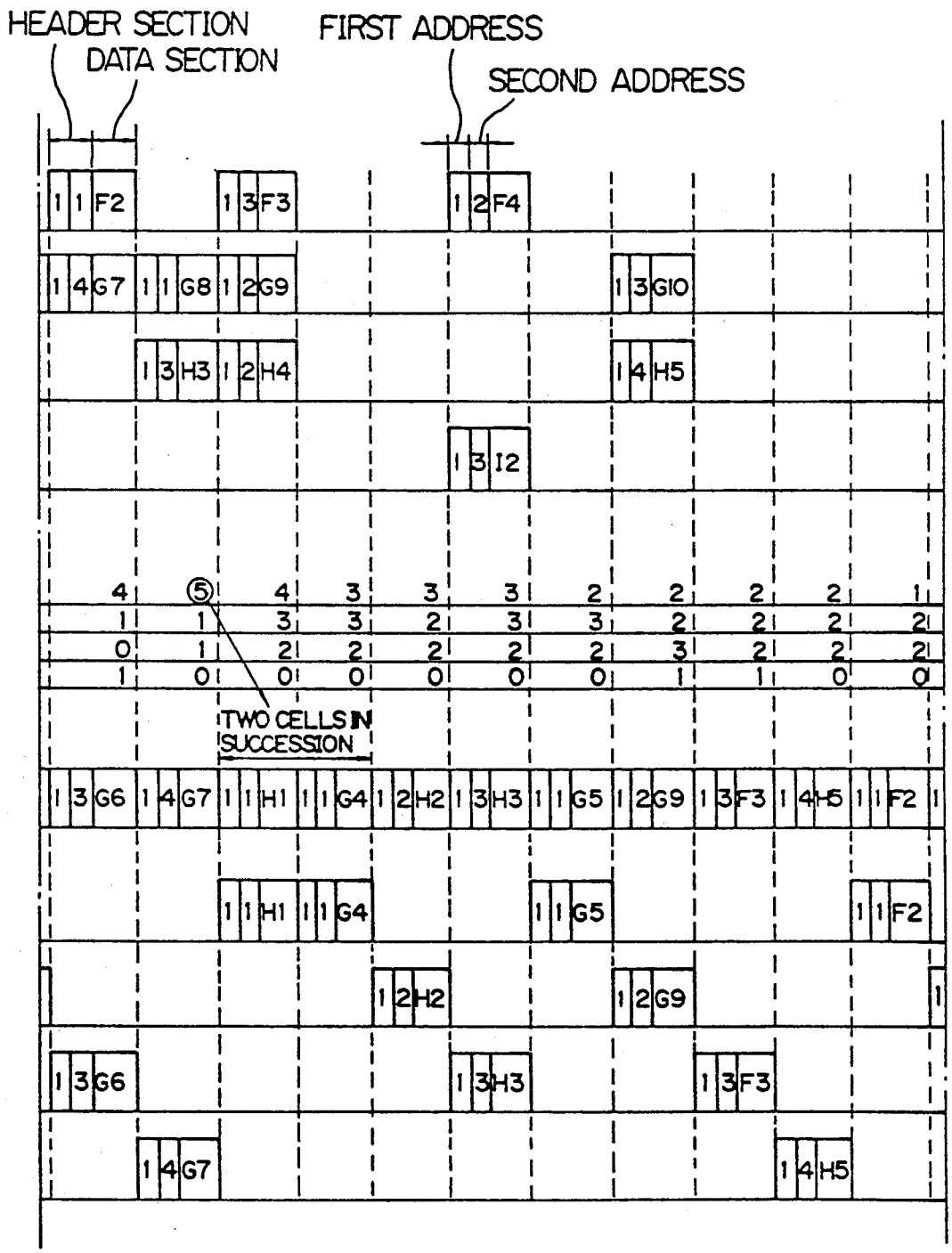
Figure 7:
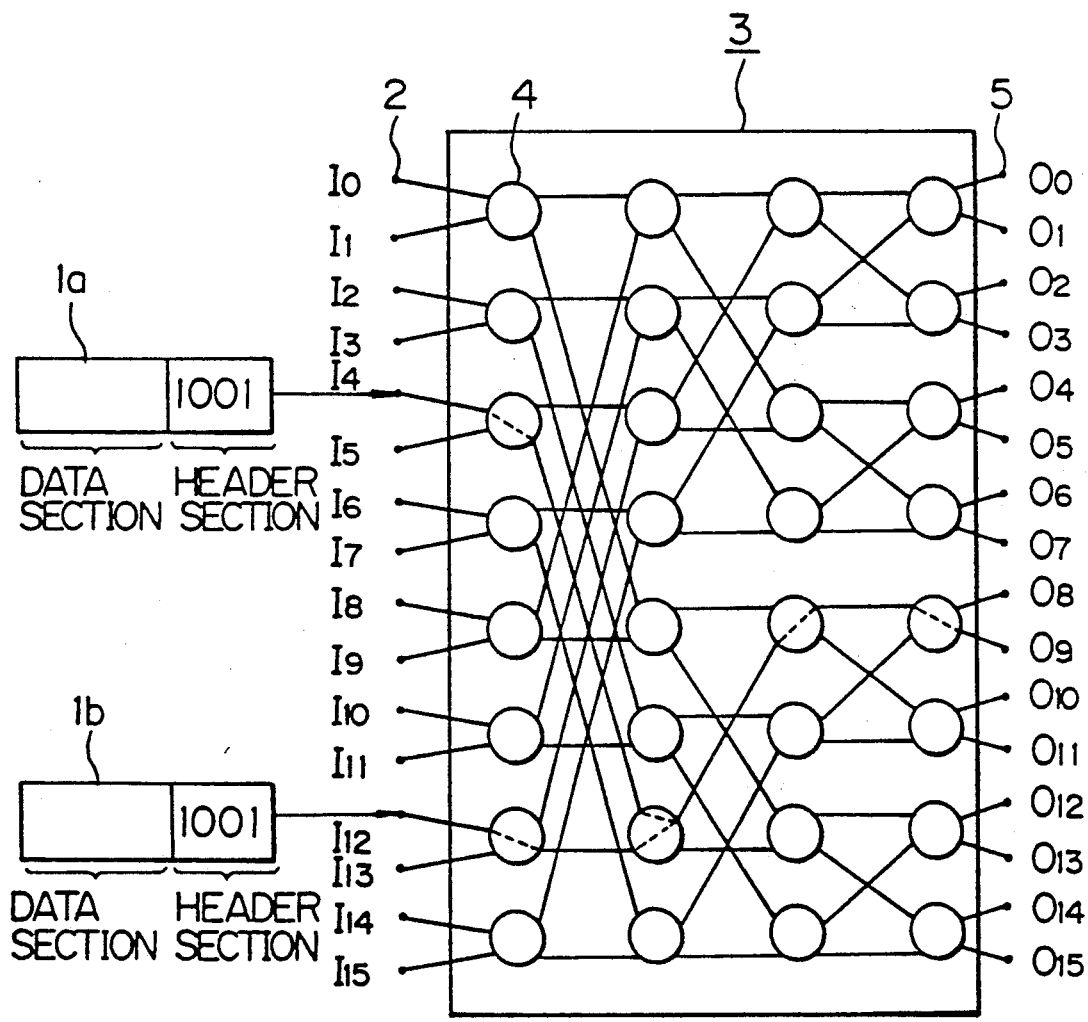
FIG. 7 shows the principle of a conventional cell exchange apparatus.

It is assumed that cell strings such as those shown in FIG. 6 are inputted as signals F to I. The signal G shows that a series of nine cells is delivered from the input-stage cell exchange switch module 61 to outgoing lines K, L, M and N. The FIFO memories 17a, 17b, 17c and 17d correspond to the outgoing lines K, L, M and N, respectively. The read enable circuit 18 monitors the amount of cells being held in each of the FIFO memories 17a to 17d. First, at the time when the address at which a first cell is stored in any of the FIFO memories 17a to 17d, the read gate of the FIFO memory 17a corresponding to the outgoing line K is opened to fetch an address. Then, one cell that corresponds to the fetched address is outputted from the memory circuit 10a to the output-stage cell multiplexing circuit 12 to start multiplexing. Multiplexing is effected in units of cells through the FIFO memories 17a, 17b, 17c and 17d in the mentioned order. If no cell is stored in an FIFO memory, the process immediately shifts to the next FIFO memory to continue the multiplexing. In this example, the first cell is a first cell in the signal F, which is directed to the outgoing line K (each cell being hereinafter denoted by a number, e.g., F1, that is put to the data section of the cell). Accordingly, an address is first fetched from the FIFO memory 17a and this address is given as a read address to the memory circuit 10a to read out and multiplex the corresponding cell. At the same time, the read address is supplied to the vacant address control circuit 19a. Upon completion of the multiplexing of the readout cell, an address is fetched from the FIFO memory 17b corresponding to the outgoing line L to multiplex the cell G2. Next, an address would otherwise be fetched from the FIFO memory 17c corresponding to the outgoing line M, but the FIFO memory 17c is vacant and consequently the process immediately shifts to the FIFO memory 17d corresponding to the outgoing line N. Thus, an address is fetched therefrom, and the cell G3 is multiplexed. Next, the cell G1 that is addressed to the outgoing line K is multiplexed, followed by the cell I1 to the outgoing line L, the cell G6 to the outgoing line M, and the cell G7 to the outgoing line N. The process then proceeds to the FIFO memory 17a corresponding to the outgoing line K. Since the number of cells being held in the FIFO memory 17a at this time is 5 (circled in FIG. 6), two addresses are successively read out therefrom. Thus, the cells H1 and G4 are multiplexed. Thereafter, the cells H2, H3, G5, G9, F3, H5, F2, H4, I2, G8, F4 and G10 are multiplexed in the mentioned order.

Thus, by virtue of the FIFO memories 17a to 17d in the output-stage cell exchange switch module 70, it is possible to control the addresses in the memory circuits 10a to 10d and cells can be temporarily stored therein. In general, the sum total of cells which are supplied to the output-stage cell exchange switch modules 70 to 73 from the signal lines corresponds, on the average, to a rate which is determined by multiplying the input link rate by the number of input ports as long as there is neither temporal nor spatial deviation, and it is therefore considered to be equal to or less than the total number of cells which can be multiplexed on multiplex signals that are produced in the output-stage cell exchange switch modules 70 to 73. Since a variation in the number of cells being held in the memory circuits 10a to 10d is caused by the fact that the number of cells arriving varies from an average both temporally and spatially, it is possible to absorb a temporal variation and minimize the waste of cells by temporarily storing cells in the memory circuits 10a to 10d, as described above.

In addition, the memory circuits 10a to 10d in the output-stage cell exchange switch modules 70 to 73 are capable of writing at a high rate of multiplexing and also capable of reading at the link rate of the outgoing lines even if a plurality of cells arrive simultaneously. Accordingly, even if a plurality of cells are concentrated at the same time, no cell is wasted as long as the number of cells concentrated is within the capacity of the memory circuits 10a to 10d.

Although in the foregoing embodiment the respective numbers of input and output ports in the whole cell exchange switch are the same, the numbers of input and output ports may be different from each other. The number of stages of the output-stage cell exchange switch modules 70 to 73 may also be increased as desired. Although in the foregoing embodiment the numbers of input and output ports in the whole cell exchange switch are each 16 and each cell exchange switch module has 4 input ports and 4 outputs ports, these numbers may be changed as desired. In addition, the cell exchange apparatus of the present invention is not necessarily divided into modules such as those described above but may be fabricated in the form of a single cell exchange switch.

In the foregoing embodiment, the number of an outgoing line is put to the header section of a cell for each of the two address sections for two groups of cell exchange switch modules which are provided in two stages. However, the number of an outgoing line may be represented by another form, for example, a coded number which is put to a single address section of a cell.

Although in the foregoing embodiment one cell is outputted to only one output port, it is possible to set the output-stage cell selecting circuits 13a to 13h so as to output one cell to a plurality of output ports by properly arranging the way of addressing. Thus, a broadcasting function may be added to the arrangement described above.

The arrangement may also be such that the header and data sections of cells are separated from each other and these sections are assigned to a plurality of signal lines, which are arranged in parallel, by use of respective circuits which have different rates of transmission.

Although in the foregoing embodiment the link rate of the input ports is the same as the output port rate, if the rate of reading from the output-stage memory circuits 10a to 10d, shown in FIG. 1, is made higher than the input port link rate, traffic concentration can be achieved, and it is also possible to make the input port link rate higher than the output port rate. In addition, although the multiplexing rate of the signal J is the same as that of the signal E, if the multiplexing rate of the signal J is made higher, it is possible to further reduce the rate at which cells are wasted in transmission between cell exchange switch module stages.

Although in the foregoing embodiment the FIFO memories 17a to 17d are provided to correspond to the outgoing lines, respectively, of the output-stage cell exchange switch module 70, it is also possible to provide a plurality of FIFO memories for each outgoing line according to the order of priority so that a cell of higher priority is first multiplexed on the basis of a sign representative of a level of priority that is added to the header section of a cell in addition to an address. Although the read enable circuit 18 is arranged such that when the number of cells being held in any one of the FIFO memories 17a to 17d exceeds 4, two cells are successively read out therefrom, it should be noted that the number is not necessarily limited to 4 and that any other numerical value may be employed. The present invention may be applied to any system wherein reading from an FIFO memory which has a relatively large number of cells being held therein is preferentially executed.

When the operating speed must be limited, a serial-to-parallel converter circuit and a parallel-to-serial converter circuit may be added to the input and output ends, respectively, of this switch to process data in the form of parallel signals.

As has been described above, the cell exchange apparatus according to the first embodiment of the present invention is arranged such that input cells are multiplexed in an input-stage cell exchange switch module before being distributed, and in an output-stage cell exchange switch module a cell string which is inputted from a pre-stage cell exchange switch module is stored in memory circuits and the cells in the memory circuits are read out according to a predetermined output rule by a memory control circuit. Accordingly, even if cells are concentrated in a specific output port group at the same time, no cell is wasted as long as the number of cells concentrated is within the capacity of the output-stage memory circuits.

Figure 3B:
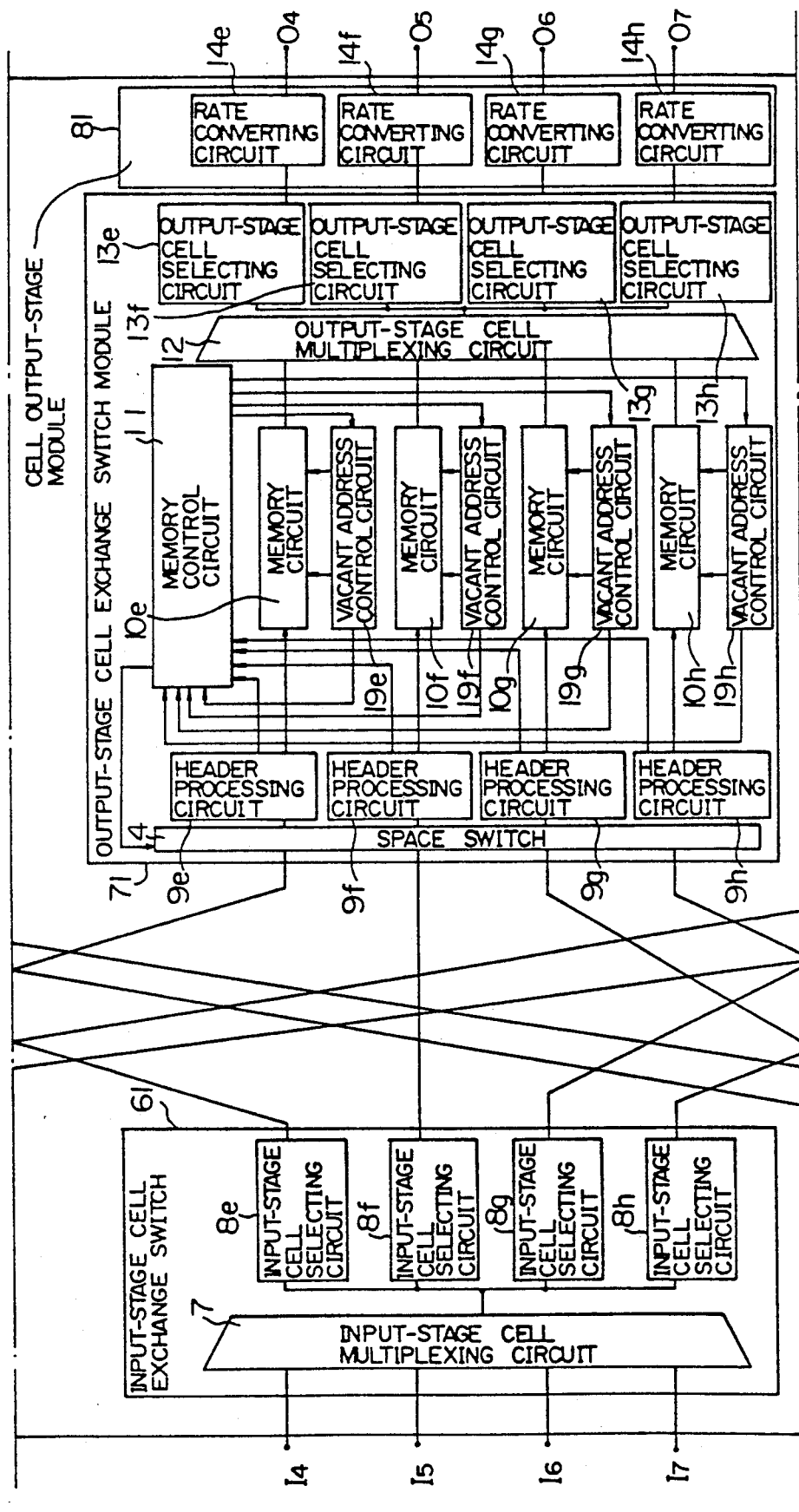

A second embodiment of the present invention will next be explained with reference to FIGS. 3 and 4. In FIG. 3, the same reference numerals as those shown in FIG. 1 denote the same elements, and in FIG. 4, the same reference numerals as those shown in FIG. 2 denote the same elements. As will be understood from the figures, the second embodiment is the same as the first embodiment in regard to the arrangements of many portions; therefore, description of the same portions is omitted to prevent complication.

Figure 4B:
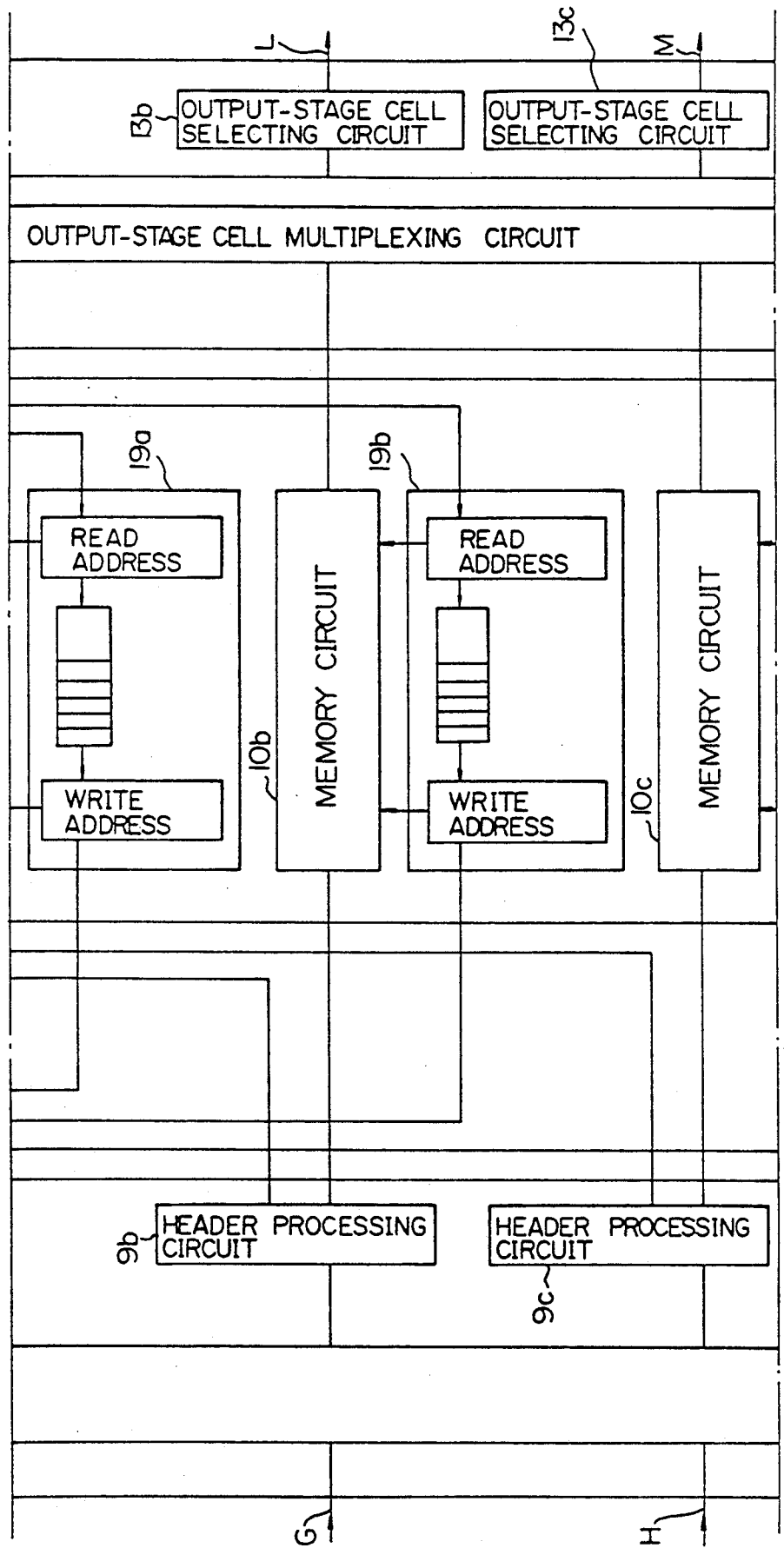

In FIGS. 3 and 4, reference numeral 4 denotes space switches that operate in such a manner that cells, which are outputted from the input-stage cell selecting circuits in the input-stage cell exchange switch modules 60 to 63 to specific output port groups, are preferentially stored in memory means (memory circuits; described later) 10a to 10d (10e to 10h) which have a relatively small amount of cells being held therein, in order to make uniform the amount of cells being held among the memory circuits 10a to 10d (10e to 10h).

Referring to FIG. 4, reference numeral 15 that is shown in the memory control circuit 11 denotes a memory circuit counter which controls the amount of cells being held in each of the memory circuits 10a to 10d.

The operation will next be explained. Since the arrival of cells which are inputted to the output-stage cell exchange switch module 70 varies both temporally and spatially, it is necessary to buffer cells in the memory circuits 10a to 10d to thereby absorb overflow of cells. The space switch 4 refers to the counter 15 for the amount of cells being held in each of the memory circuits 10a to 10d and stores each input cell preferentially in a memory circuit which has a relatively small amount of cells being held therein, thereby making the amount of cells being held as uniform as possible among the memory circuits 10a to 10d. More specifically, the space switch 4 refers to the memory circuit counter 15 in the memory control circuit 11 and, when m cells arrive at the same time, the space switch 4 selects from among the memory circuits 10a to 10d m memory circuits, from one which has the smallest amount of cells being held therein, and successively writes the cells in the selected memory circuits, respectively.

At this time, the cells that are outputted from the space switch 4 are delivered to given memory circuits 10a to 10d through the corresponding header processing circuits 9a to 9d, which analyze the destinations of the cells concerned and deliver the identification information of the corresponding ones of outgoing lines K to N to the address exchange circuit 16 in the memory control circuit 11. When the cells are stored in the memory circuits 10a to 10d, the addresses where the cells are stored are delivered to the address exchange circuit 16 by the corresponding vacant address control circuits 19a to 19d. The address exchange circuit 16 stores the delivered addresses in the FIFO memories 17a to 17d corresponding to the outgoing lines K to N which are designated by the header processing circuits 9a to 9d. At this time, the memory circuit counter 15 counts and controls the amount of cells being held in each of the memory circuits 10a to 10d.

In comparison to the first embodiment, the above-described second embodiment provides the following advantages. Since the space switch 4 is employed to preferentially write cells in memory circuits 10a to 10d (10e to 10h) which have a relatively small amount of cells being held therein in order to make the amount of cells being held as uniform as possible among the memory circuits 10a to 10d (10e to 10h), the memory circuits 10a to 10d (10e to 10h) can perform in substantially the same way as in the case of a single relatively large memory circuit which is mutually used for all the incoming lines. It is therefore possible to further reduce the rate at which cells are wasted due to the fact that the arrival of cells varies both temporally and spatially.

Thus, according to the second embodiment of the present invention, when receiving cells which have been once multiplexed and distributed into destinations in the input-stage cell exchange switch module, the output-stage cell exchange switch module preferentially writes the cells into memory means which have a relatively small amount of cells being held therein, and the cells are read out from the memory means under the control of the memory control means and multiplexed again for each destination before being distributed to the corresponding output ports. Accordingly, it is possible to obtain a cell exchange apparatus which is free from the problem of blocking and in which, even if cells are concentrated in a specific output port, there is little probability that the cells will be wasted, and switching can be performed without affecting cells which are directed to other output ports.

What is claimed is:

1. A cell exchange apparatus comprising:
    an input-stage cell exchange switch module having an input-stage cell multiplexing circuit which subjects input cells to time-division multiplexing for each of a plurality of groups each comprising a plurality of input ports through which cells are inputted, and an input-stage cell selecting circuit which selects, from an output signal from said input-stage cell multiplexing circuit, a cell which is directed to a specific one of a plurality of groups each comprising a plurality of output ports, and outputs said selected cell;
    an output-stage cell exchange switch module having a memory circuit for storing a cell which is outputted from either said input-stage cell selecting circuit or an output-stage cell selecting circuit in the pre-stage to a specific output port group, a memory control circuit which controls the number of cells being stored in said memory circuit for each destination and outputs a cell from said memory circuit according to a predetermined output rule, an output-stage cell multiplexing circuit which multiplexes a cell that is outputted from said memory circuit, and an output-stage cell selecting circuit which selects, from an output signal from said output-stage cell multiplexing circuit, a cell which is directed to either a specific one of said output port groups or a specific one of said output ports and outputs said selected cell; and a cell output-stage module which is connected to said output-stage cell exchange switch module in the final stage and which has a rate converting circuit that converts the rate of time-division multiplexed cells into a rate of said output ports.

2. A cell exchange apparatus that outputs cells, which are inputted through a plurality of input ports, each cell having a header section and a data section, to respective output ports which are designated by the header sections of said cells, comprising:

an input-stage cell exchange switch module to which are connected said input ports, said input-stage cell exchange switch module having an input-stage cell mutiplixing means for time-division multiplexing cells which are inputted to said input ports, and an input-stage cell selecting means for selecting from among cells which are outputted from said input-stage cell multiplexing means a cell which is directed to a predetermined destination and outputting said selected cell;

at least one output-stage cell exchange switch module which is connected to said input-stage cell exchange switch module, said output-stage cell exchange switch module having a space switch which effects switching by spatially disposing contacts with respect to cells which are outputted from either said input-stage cell selecting means in said input-stage cell exchange switch module or an output-stage cell selecting means which is provided in another output-stage cell exchange switch module that is disposed in the prestage, a header processing means which analyzes the destination of each cell which is outputted from said space switch, a memory means which enables cells that are outputted from said header processing means to be written therein and read out therefrom by designating respective addresses, a memory control means including an address exchange section which distributes the addresses of said cells written in said memory means to the corresponding destinations by referring to said header processing means, an outgoing line corresponding address memory section which enables addresses that are outputted from said address exchange section to be written therein and read out therefrom in the order of arrival and according to the destination, a read enable section which successively outputs addresses that are outputted from said outgoing line corresponding address memory section to enable reading of cells from said memory means, and a memory circuit counter that counts the number of cells being held in said memory means and delivers the counted number to said space switch, a vacant address control means which reads out cells from said memory means by use of addresses that are outputted from said memory control means and which stores said addresses as being vacant addresses and outputs each vacant address as being a write address when a new cell is to be written into said memory means, an output-stage cell multiplexing means for multiplexing cells that are read out from said memory means, and an output-stage cell selecting means for selecting from among cells that are outputted from said output-stage cell multiplexing means a cell which is directed to a predetermined destination and outputting the selected cell; and a cell output-stage module which is connected to said output-stage cell exchange switch module in the final stage and to which are connected said output ports, said cell output-stage module having a rate converting means which is connected to said output-stage cell selecting means of said output-stage cell exchange switch module in the final stage to convert the rate of time-division multiplexed cells into a rate of said output ports.

3. A cell exchange apparatus comprising:

a plurality of input switching modules for receiving cells from a plurality of input lines and outputting the cells to a plurality of output lines on the basis of destination information contained in each of said cells;

a plurality of buffer modules, each buffer module comprising means for storage of cells and means for selecting and outputting cells;

buffer module input means for connecting each of said plurality of output lines of said plurality of input switching modules to one of said plurality of buffer modules;

a plurality of output switching modules, corresponding to said buffer modules, for receiving cells from said buffer modules and outputting them to a plurality of output lines on the basis of information contained in the cell;

storage means for storing and outputting cells;

memory control means for selecting cells in the storage means to be output from the storage means, including;

address exchange means for receiving cell address information and cell intended destination information for cells in the storage means and in correspondence with said cell intended destination information providing each cell's address information, a plurality of FIFO memories, corresponding to possible cell destinations, for receiving from said address exchange means and for storing cell address information indicating locations in said memory occupied by said cells, and means for reading cell address information from the FIFO memories and for providing that cell address information to the storage means, header processing means for supplying destination information from input cells to the memory control means; and means for specifying to the memory control means cell address information corresponding to input cells received and stored in the storage means.

4. A cell exchange apparatus as defined in claim 3, wherein said storage means comprises a plurality of memory means provided in correspondence with said input lines, each said memory means having;

memory circuit means for storing and outputting cells, and vacant address control means for identifying to the means for specifying cell address information the locations of cells stored in memory and for retrieving cells specified by the memory control means for output.

5. A cell exchange apparatus as defined in claim 4, further including a space switch for taking a cell from an input line, selecting one of said memory means and providing the cell to that memory means.

6. Buffer means for receiving input cells from a plurality of input lines and outputting those cells onto at least one line comprising:
- storage means for storing and outputting cells;
- memory control means for selecting cells in the storage means to be output from the storage means, including;
    - address exchange means for receiving cell address information and cell intended destination information for cells in the storage means and in correspondence with said cell intended destination information providing each cell's address information,
    - a plurality of FIFO memories, corresponding to possible cell destinations, for receiving from said address exchange means and for storing cell address information indicating locations in said memory occupied by said cells, and
    - means for reading cell address information from the FIFO memories and for providing that cell address information to the storage means,
- header processing means for supplying destination information from input cells to the memory control means;
- means for specifying to the memory control means cell address information corresponding to input cells received and stored in the storage means; and
- memory circuit means for storing and outputting cells, and
- vacant address control means for identifying to the means for specifying all address information the locations of cells stored in memory and for retrieving cells specified by the memory control means for output.

7. Buffer means as defined in claim 6, further comprising a space switch for taking a cell from an input line, selecting one of said memory means and providing the cell to that memory means.

* * * * *